United States Patent [19]

Yoshimura et al.

[11] Patent Number: 5,279,906
[45] Date of Patent: Jan. 18, 1994

[54] INTERCONNECTION MATERIAL FOR SOLID OXIDE FUEL CELL

[75] Inventors: Takayoshi Yoshimura, Kurobe; Masaki Sato, Ichikawa; Toshio Arai, Toyama, all of Japan

[73] Assignee: Yoshida Kogyo K.K., Tokyo, Japan

[21] Appl. No.: 988,734

[22] Filed: Dec. 10, 1992

[30] Foreign Application Priority Data

Dec. 17, 1991 [JP] Japan .................................. 3-333441

[51] Int. Cl.⁵ .............................................. H01M 8/10
[52] U.S. Cl. ........................................ 429/30; 75/235; 252/513; 252/512; 252/518
[58] Field of Search .................. 429/30; 75/235; 252/513, 519, 518, 517

[56] References Cited

U.S. PATENT DOCUMENTS 3,317,285 5/1967 Alexander et al. .................... 75/235
4,853,100 8/1989 Hsu .................................... 204/279

Primary Examiner—Kathryn Gorgos
Attorney, Agent, or Firm—Flynn, Thiel, Boutell & Tanis

[57] ABSTRACT

An interconnection material of a solid oxide fuel cell for electrically connecting adjacent unit cells, each of which comprises one electrode, electrolyte and the other electrode. The interconnection material is made of a mixture of an alloy mainly containing nickel and chromium with oxide ceramics in an amount of 50 to 85 wt. % of the mixture. The interconnection material has a high electrical conductivity and good compatibility with other constituent materials of a solid oxide fuel cell.

4 Claims, 4 Drawing Sheets

INTERCONNECTION MATERIAL FOR SOLID OXIDE FUEL CELL

BACKGROUND OF THE INVENTION

1. Field of the Invention

The present invention relates to an interconnection material for a solid oxide fuel cell.

2. Description of the Prior Art

An interconnection material for a solid oxide fuel cell (SOFC) requires a high electrical conductivity, stability in oxidizing and reducing atmospheres, and a good characteristic of electrical contact with an electrode. A perovskite-type oxide prepared by adding alkaline earth metals to $LaCrO_3$ has been widely used for an interconnection material for solid oxide fuel cells so far.

However, the above material has an electrical conductivity of only about 10 $Scm^{-1}$ at 1,000° C., which is the operating temperature of a fuel cell. Therefore, it is a factor of the internal resistance during power generation of a fuel cell. Moreover, the material has a problem that its electrical conductivity further decreases in a reducing atmosphere.

SUMMARY OF THE INVENTION

Therefore, it is an object of the present invention to provide an interconnection material having a high electrical conductivity and compatibility with other constituent materials of a solid oxide fuel cell.

As the result of having studied carefully and in detail, the inventors of the present invention found that it is possible to provide an interconnection material with a high electrical conductivity by using a metal for the member, to stabilize the member against oxidation by using a so-called heat resisting alloy, to arbitrarily set the thermal expansion coefficient of the member by adding an oxide ceramic to the metal, and thereby to provide the member with compatibility with other constituent materials of a fuel cell. Thus, the present invention has been made.

The present invention relates to an interconnection material for a solid oxide fuel cell for electrically connecting adjacent unit cells, each of which comprise one electrode, electrolyte and the other electrode, the interconnection material being made of a mixture of an alloy mainly containing nickel and chromium and oxide ceramics in an amount of 50 to 85 wt. % of the mixture.

DETAILED DESCRIPTION OF THE PREFERRED EMBODIMENTS

The alloy mainly made of nickel and chromium used in the present invention uses a nickel-chromium alloy or an alloy prepared by adding iron, aluminum, silicon and so forth to nickel and chromium. The latter alloy includes Inconel 600 and Inconel 601. The composition ratio by weight of nickel, chromium, and iron of the above alloy is preferably 50–80:50–20:0–15.

As the oxide ceramics used in the present invention, alumina, silica, or mixtures of alumina and silica can be used. Because the oxide ceramic is added to adjust the thermal expansion coefficient of the interconnection material of the present invention, the same effect is obtained by using silica (thermal expansion coefficient of 5 $MK^{-1}$, or the like instead of alumina used in the following embodiments.

The interconnection material of the present invention is made of a mixture prepared by adding 50 to 85 wt. % of a ceramic, based on the total weight of the mixture, to the alloy. The alloy and ceramics are mixed by powder-mixing method, shaped according to necessity, and used as members for connecting unit cells. It is preferable to form the connecting member by plasma spraying or gas flame spraying because the electrical connection of metal can be preferably kept under a mixed state of metal and ceramics.

The interconnection material of the present invention shows an electrical conductivity of at least 1,000 $Scm^{-1}$ even at 1,000° C., the electrical contact of the member with an fuel electrode and oxygen electrode is stable for a long time, and the thermal expansion coefficient can be lowered to about 10 $MK^{-1}$ The present invention will be described below with reference to the following examples.

Examples

Figure 1:
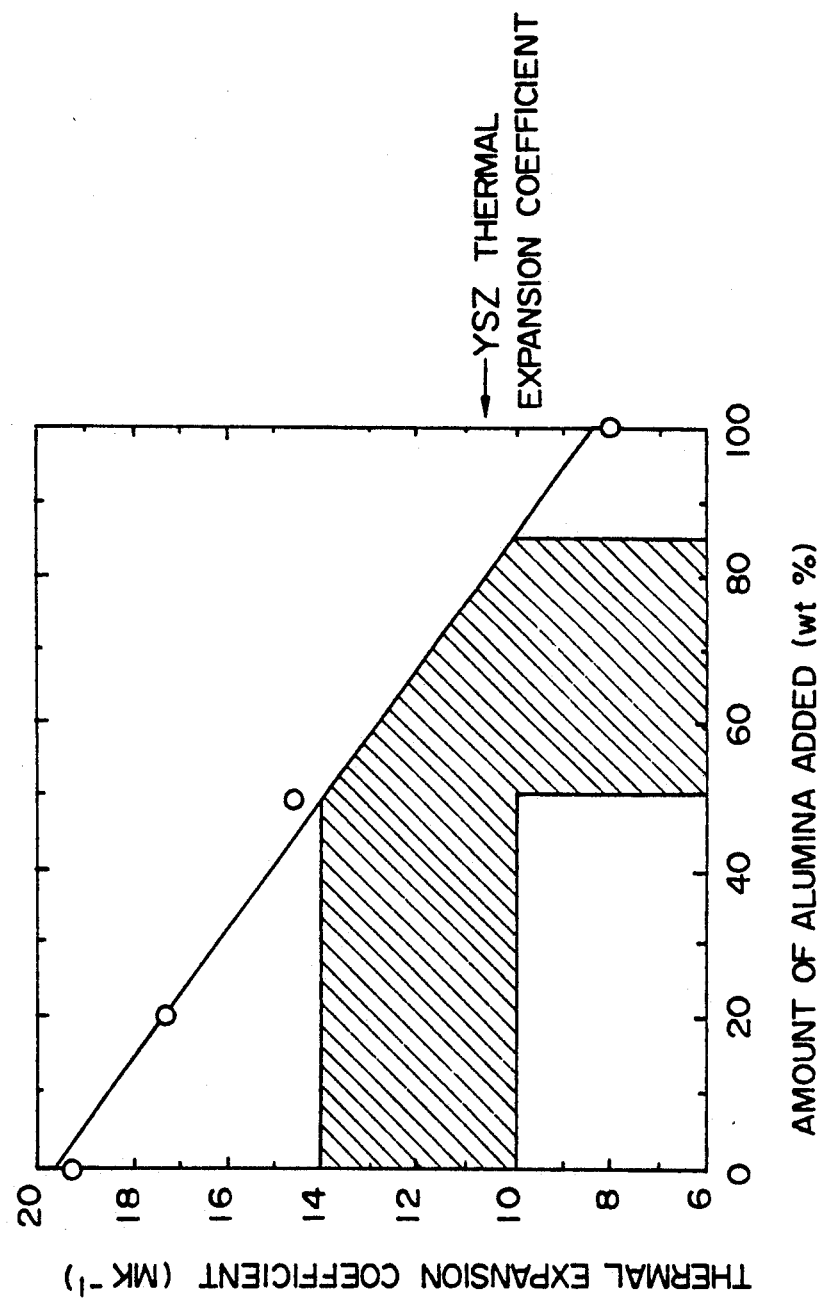
FIG. 1 is a graph showing the relationship between the thermal expansion coefficient of an interconnection material of a Ni alloy containing 20 wt. % of Cr and alumina and the amount of alumina added.

FIG. 1 shows a relationship between the thermal expansion coefficient of a mixture of an Ni alloy containing 20 wt. % of Cr with alumina, and the amount of alumina added.

From FIG. 1, it can be seen that the thermal expansion coefficient decreases as the amount of alumina added increases. When the material is used as an interconnection in a solid oxide fuel cell, the compatibility of it with yttria-stabilized zirconia (YSZ-whose thermal expansion coefficient is indicated by the arrow in FIG. 1) used as the electrolyte of the cell is especially important. The range of 50 to 85 wt. % of the amount of alumina added in the present invention corresponds to the range of 10 to 14 $MK^{-1}$ of the thermal expansion coefficient and it is obvious that the former range is compatible with the thermal expansion coefficient of the YSZ indicated by the arrow in FIG. 1. In this case, the lower limit is set to 10 $MK^{-1}$ because the amount of alumina added becomes excessive, and the excessive amount of alumina detrimentally affects the conductivity if the lower limit is set lower than the value.

Figure 2:
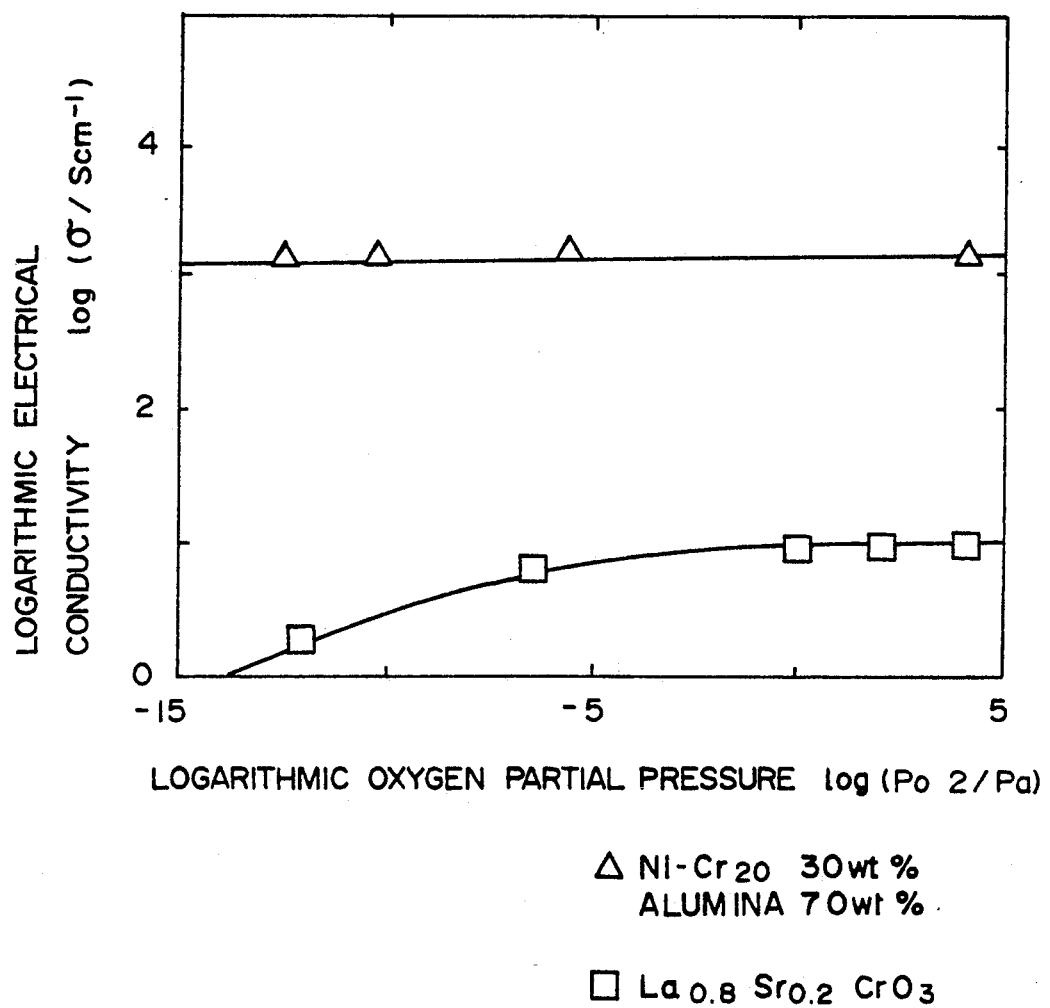
FIG. 2 is a graph showing the relationship between the electrical conductivity of an interconnection material made of a mixture (alumina content of 70 wt. %) of Ni alloy containing 20 wt. % of Cr and alumina and the oxygen partial pressure at 1,000° C.

FIG. 2 shows the dependency of the electrical conductivity of an interconnection formed through the plasma-spraying of powder prepared by adding alumina to Ni alloy containing 20 wt. % of Cr in an oxygen partial pressure at 1,000° C. From FIG. 2, it is found that the material of the present invention shows a good electrical conductivity exceeding 1,000 $Scm^{-1}$ From FIG. 2, it is also seen that the material of the present invention exhibits a stable high electrical conductivity in a wide range of atmospheres from an oxidizing one to a reducing one though the electrical conductivity of $La_{0.8}Sr_{0.2}CrO_3$, which has been widely used, decreases as the atmosphere approaches a reducing atmosphere.

The interconnection of the present invention electrically connects unit cells integrated on a substrate. The following is a mode of the member in practical use.

Figure 3:
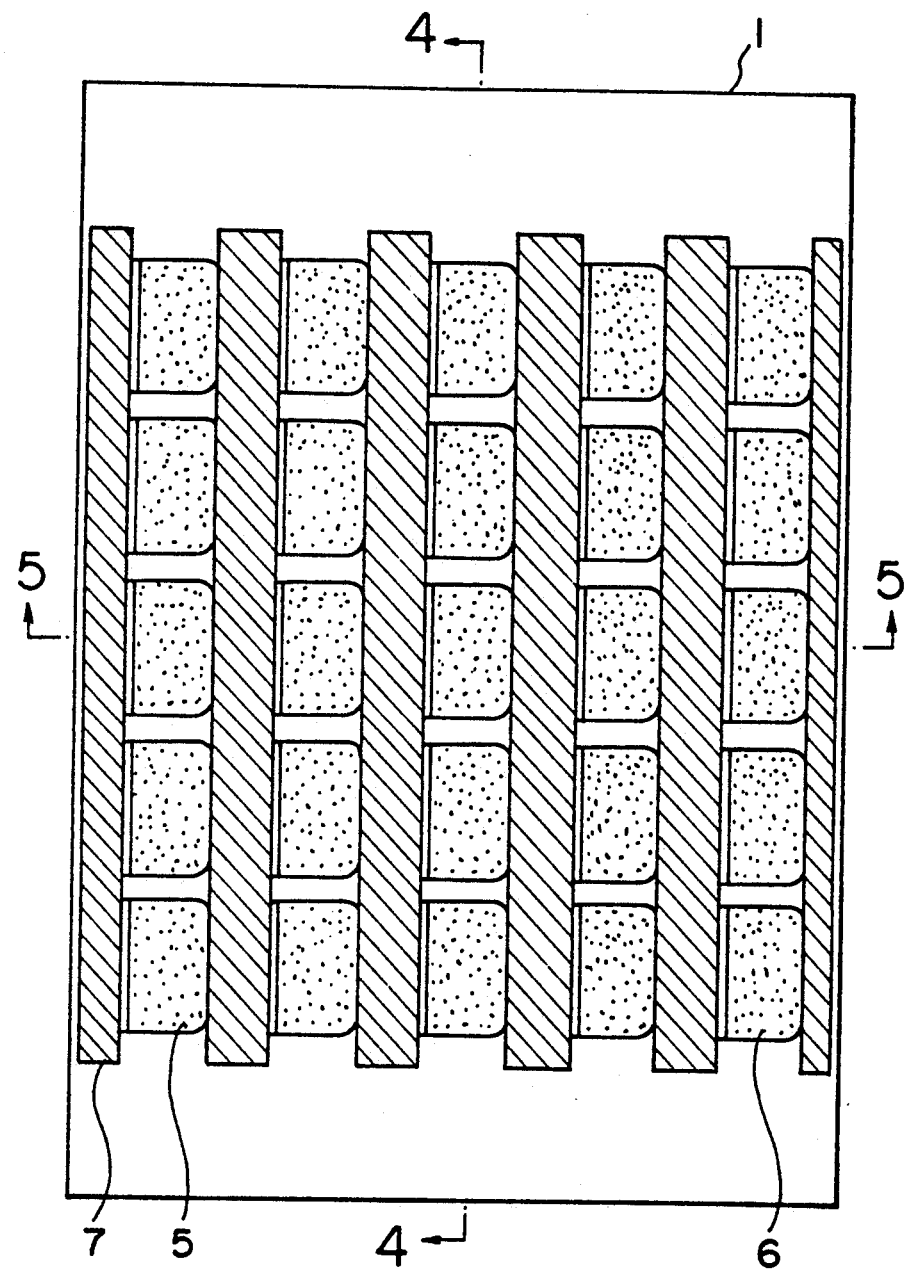
FIG. 3 is a schematic plan view of a solid oxide fuel cell.
Figure 4:
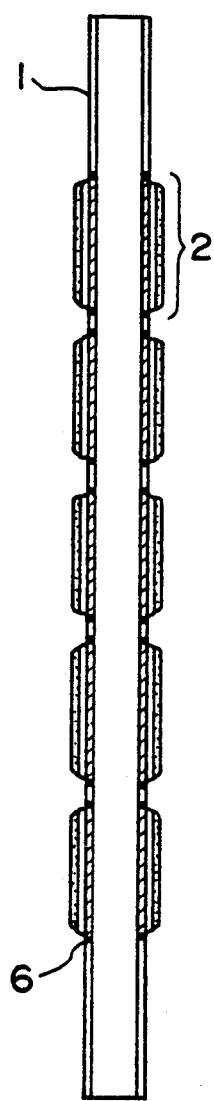
FIG. 4 is a sectional view of the cell in FIG. 3, taken along line Y—Y of FIG. 3.
Figure 5:
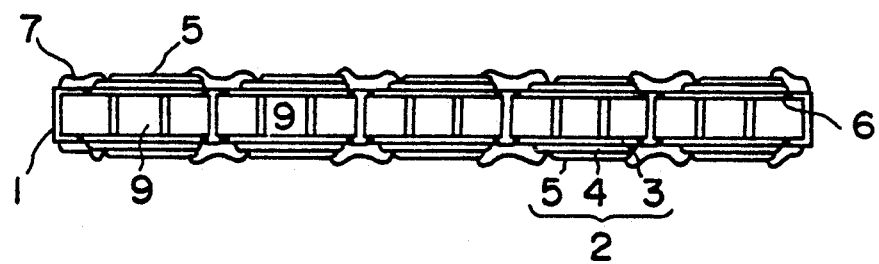
FIG. 5 is a sectional view of the cell in FIG. 3, taken along line X—X of FIG. 3.

FIG. 3 is a schematic plan view of the whole of a solid oxide fuel cell and FIGS. 4 and 5 are sectional views of the cell in FIG. 3, taken along the lines Y—Y and X—X of FIG. 3.

A dense substrate 1 is formed of alumina by extrusion pressing, cell mounting holes are bored in the dense substrate, and the dense substrate is fired at 1,400° to 1,700° C. Unit cells are installed in the mounting holes respectively. It is possible to use unit cells previously fabricated or made on the spot. The following is the description of the case where previously-made unit cells are used.

First, porous air electrode bases 3 are fabricated by forming a green film made of $La_{0.8}Sr_{0.2}MnO_3$ by a doctor blade method, cutting it with a cutter and firing it at 1,200° to 1,500° C. Then, an electrolyte film 4 is manufactured by masking the current output port of the porous air electrode bases 3 and spraying yttria-stabilized zirconia on the electrode base 3 by a plasma spraying method.

Lastly, the unit cell 2 is finished by masking the electrolyte film 4 and spraying NiO-YSZ on it by a flame spraying method to form a fuel electrode film 5.

A plurality of manufactured cells 2 are secured in the cell mounting holes 10 on the dense substrate 1 by the aluminum adhesive 6. In this embodiment, after securing twenty five cells on one side of the dense substrate 1, the interconnections 7 are formed by masking the dense substrate 1 and applying the above-mentioned interconnection material to the substrate 1 by plasma or flame spraying and, thus, the cells 2 are connected in series and in parallel.

After securing the cells on one side of the dense substrate 1, a solid oxide fuel cell is finished by applying the above operation to the other side.

Electric power can be generated by keeping the finished solid oxide fuel cell at about 1,000° C. and supplying oxygen to the hollow section 9 of the dense substrate 1 and hydrogen to the fuel electrode side of it.

As described above, the interconnection material according to the present invention shows a high electrical conductivity in a wide range of atmosphere from an oxidizing one to a reducing one and the thermal expansion coefficient can be controlled by the amount of oxide ceramics. Therefore, it is easy to provide the material with compatibility for other materials of a fuel cell.

What is claimed is:

1. An interconnection material for electrically connecting adjacent unit cells of a solid oxide fuel cell, said interconnection material having a thermal expansion coeficient of 10 to 14 $MK^{-1}$ and an electrical conductivity of at least 1,000 $Scm^{-1}$ at 1,000° C. and made of a mixture comprising an alloy mainly containing nickel and chromium and an oxide selected from the group consisting of silica, alumina and mixtures thereof, said oxide present in an amount of 50 to 85 percent of the mixture.

2. The interconnection material of claim 1, wherein said oxide is silica.

3. The interconnection material of claim 1, wherein said oxide is alumina.

4. The interconnection material of claim 1, wherein said oxide is a mixture of silica and alumina.

* * * * *